United States Patent [19]

Fisher, Jr.

[11] Patent Number: 4,515,524
[45] Date of Patent: May 7, 1985

[54] DRAFT TUBE FOR HYDRAULIC TURBINE

[75] Inventor: Richard K. Fisher, Jr., Jacobus, Pa.

[73] Assignee: Allis-Chalmers Corporation, Milwaukee, Wis.

[21] Appl. No.: 423,534

[22] Filed: Sep. 27, 1982

[51] Int. Cl.³ ............................................. F04D 29/40
[52] U.S. Cl. ............................. 415/219 R; 415/53 T; 415/168; 415/207
[58] Field of Search ............ 415/DIG. 1, 119, 219 R, 415/53 T, 56, 11, 52, 144, 168, 207, 121 A; 60/696

[56] References Cited

U.S. PATENT DOCUMENTS

| 2,709,917 | 6/1955 | Bruynes | 415/DIG. 1 |
| 2,948,148 | 8/1960 | D'Anfreville et al. | 415/DIG. 1 |
| 2,957,306 | 10/1960 | Attinello | 415/DIG. 1 |
| 3,456,456 | 7/1969 | Rietdijk | 415/DIG. 1 |
| 4,098,073 | 7/1968 | Adkins et al. | 415/DIG. 1 |
| 4,419,045 | 12/1983 | Andre et al. | 415/DIG. 1 |

FOREIGN PATENT DOCUMENTS

| 311050 | 10/1971 | U.S.S.R. | 415/DIG. 1 |
| 631638 | 11/1978 | U.S.S.R. | 415/DIG. 1 |

OTHER PUBLICATIONS

Grenzschichtbeeinflussung bei Diffusoren von Stromungsmaschinen, Dr. Ing K. Kaufman, 1957.

Primary Examiner—Samuel Scott
Assistant Examiner—Brian J. Bowman
Attorney, Agent, or Firm—Timothy R. Conrad

[57] ABSTRACT

A draft tube for discharging fluid from a hydraulic turbine is disclosed as having a draft tube wall surrounding a discharge passage which diverges from a turbine runner to a discharge opening. The draft tube includes a first region downstream of the runner which has a rate of divergence less than that at which boundary layer separation occurs. A second region, downstream from the first region, has a rate of divergence greater than that at which boundary layer separation normally occurs. The draft tube wall surrounding the second region is provided with a plurality of orifices. A plurality of nozzles are provided on the draft tube wall surrounding the first region. Piping connects the orifices with fluid inlets of the nozzles. The nozzles have fluid outlets which communicate with the discharge passage in the first region and open away from the turbine runner. Fluid along the wall in the second region passes through the orifices and piping and into the nozzles. The fluid is drawn from the nozzle into the fluid flow in the first region whereby boundary layers which would normally form along the wall in the second region are drawn off by the flow in the first region.

5 Claims, 4 Drawing Figures

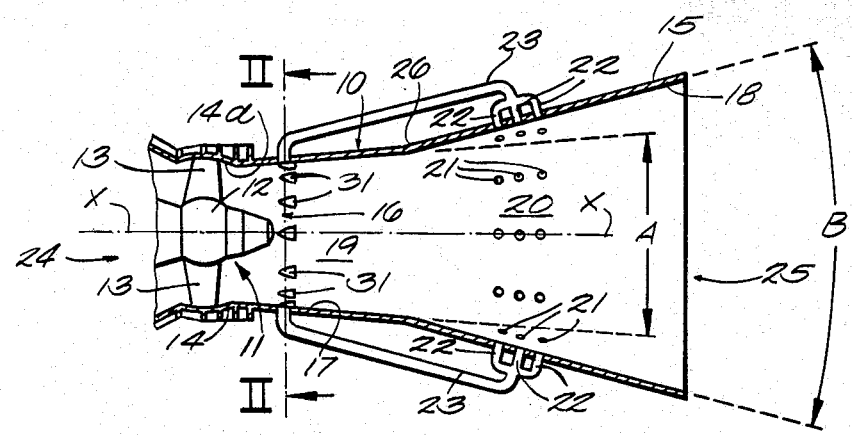
FIG. 1
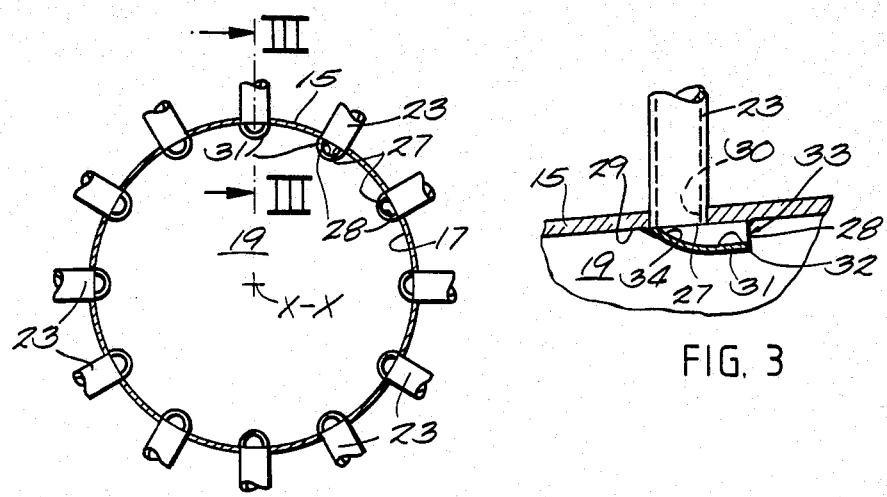
FIG. 2
FIG. 3
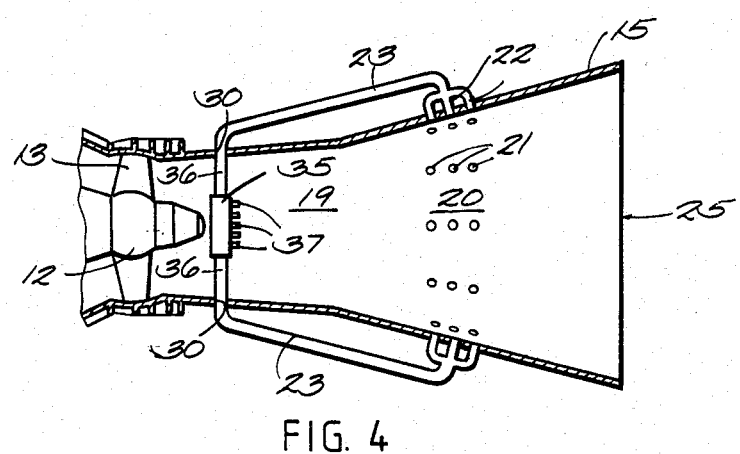
FIG. 4

DRAFT TUBE FOR HYDRAULIC TURBINE

BACKGROUND OF THE INVENTION

1. Field of the Invention

This invention relates to a draft tube for hydraulic turbines. More particularly, this invention relates to a draft tube having means to avoid boundary layer separation along the draft tube wall.

2. Description of the Prior Art

In hydraulic turbine installations, draft tubes are well known for directing the flow of water from the turbine runner to a discharge reservoir. The draft tube is designed to recover, by diffuser action, a major portion of the kinetic energy of the water delivered to the draft tube.

The cross-sectional area of draft tubes is divergent. That is, the cross-sectional area increases from an upstream end near the turbine runner to a downstream end near the discharge reservoir. The rate of divergence must not exceed certain limits in order to avoid a phenomena whereby water flow within the draft tube will lose contact with the draft tube wall. This phenomena is commonly referred to as boundary layer separation and is undesirable since it results in a loss of energy. As taught in U.S. Pat. No. 1,467,168 to Kaplan, dated Sept. 4, 1923, the rate of divergence (expressed as the included angle of an equivalent cone of the draft tube) is preferably no more than 10°. Accordingly, to prevent boundary layer separation, draft tubes, having a predetermined cross-sectional area at their discharge ends, need be of substantial length to stay within the divergence limit. The substantial length materially adds to the cost of construction of the draft tube and loss of energy by reason of friction between the fluid and the draft tube wall.

The aforementioned U.S. Pat. No. 1,467,168 teaches an elbow-shaped draft tube which operates to deflect the flow of water and force the fluid flow across the width of the draft tube to contact the draft tube walls.

Apparatus for controlling boundary layer separation are known in arts other than hydraulic turbine installations. For example, U.S. Pat. No. 4,132,499 dated Jan. 2, 1979, teaches a wind driven energy generating device having a shroud downstream of rotor blades with air channels through the shroud for injecting a high kinetic energy flow of air from exterior the shroud into the boundary layer. U.S. Pat. No. 4,098,073 to Adkins et al dated July 4, 1978, discloses a diffuser for a gas turbine with the diffuser having first divergent duct connected by a sudden enlargement of flow area to a second divergent duct. Vortices which develop within the area of the enlargement operate to diffuse the flow and avoid boundary layer separation. U.S. Pat. No. 2,808,197 to Forgo dated Oct. 1, 1957, discloses a fan assembly for air cooled condensers of steam power plants. The fan is provided with a shroud downstream of the fan blades having openings for permitting air to pass from the shroud to immediately upstream of the fan blades.

OBJECTS AND SUMMARY OF THE INVENTION

It is an object of the present invention to provide a draft tube for a hydraulic turbine having means to prevent boundary layer separation along the draft tube wall.

It is a further object of the present invention to provide a draft tube for a hydraulic turbine having a portion of the draft tube with a rate of divergence greater than the rate at which boundary layer separation would normally occur with the draft tube utilizing pressure differential within the tube to pass water from the high divergence, high pressure portion of the draft tube to a low divergence, low pressure portion of the draft tube.

According to a preferred embodiment of the present invention, there is provided a draft tube for a hydraulic turbine which directs a flow of water from an upstream end near a turbine runner to a downstream end. The tube has a wall defining a discharge passage through which the water flows which terminates at a discharge opening at the downstream end. The tube includes a first region having a rate of divergence less than that at which boundary layer separation normally would occur. A second region, immediately downstream of the first, has a rate of divergence greater than that at which boundary layer separation normally would occur.

A plurality of orifices are provided extending through the wall in the second region. The orifices are connected in fluid flow communication with a plurality of nozzles within the first region. Higher pressure in the second region than the first region (resulting from the divergent flow) urges water that would otherwise separate from the wall in the second region through the orifices into the nozzles in the first region where the water is accelerated to regain its velocity which is subsequently recovered in the draft tube.

BRIEF DESCRIPTION OF THE DRAWINGS

FIG. 1 is a lateral sectional view of a hydraulic turbine draft tube;

FIG. 2 is a cross-sectional view of the draft tube taken along line II—II of FIG. 1;

FIG. 3 is a view of a nozzle taken along line III—III of FIG. 2; and,

FIG. 4 is a lateral sectional view of an alternate embodiment.

DESCRIPTION OF THE PREFERRED EMBODIMENT

Referring to FIG. 1, a draft tube 10 for a hydraulic turbine installation is shown. The installation includes a hydraulic turbine having a runner 11 mounted for rotation about a horizontal axis of rotation X—X. Runner 11 comprises a hub 12 having a plurality of radially extending blades 13. Runner 11 is connected to a rotary shaft (not shown) which extends axially away from hub 12 on a side thereof remote from draft tube 10 and engages a generator (not shown). A discharge ring 14 surrounds blades 13 and defines a water passage 14a for guiding water past runner 11 and toward draft tube 10. It will be appreciated while the turbine shown in FIG. 1 is provided with a propeller-type runner with a horizontal axis of rotation, the draft tube 10 (as will be described) is applicable to other types of runners with other orientations.

As shown in FIG. 1, draft tube 10 comprises a wall 15, fabricated from plate steel or the like, with an upstream end 24 connected to a downstream end 16 of discharge ring 14. Wall 15 defines a discharge passage 17 within draft tube 10. The upstream end 24 of draft tube 10 is sized so as to provide smooth continuity between water passage 14a and discharge passage 17. Discharge passage 17 extends from upstream end 24 and diverges toward a downstream end 25 of draft tube 10. At the downstream end 25, wall 15 defines a discharge opening 18 permitting passage of water from discharge passage 17 to a reservoir (not shown).

Draft tube 10 comprises two regions. A first region 19 located immediately downstream of discharge ring 14 is provided as having a frusto-conical shape diverging away from the upstream end 24. The rate of divergence of region 19 (expressed as the included angle of the equivalent cone of the frusto-conical shape and indicated as A between the dashed lines of FIG. 1) is less than the rate of divergence at which water flowing through region 19 would normally experience boundary layer separation along wall 15 within region 19. As taught in the aforesaid U.S. Pat. No. 1,467,168 to Kaplan, to prevent boundary layer separation within region 19, the rate of divergence within region 19, or A, is preferably no more than 10°.

Draft tube 10 is further provided as having a second region 20 immediately downstream of first region 19. Second region 20 is provided as having a frusto-conical shape diverging away from the first region to discharge opening 18. As shown at 26, the wall 15 at the location of joinder of regions 19 and 20 is smooth and continuous. The rate of divergence of second region 20 (expressed as the included angle and the equivalent cone of the frusto-conical shape and indicated as B between the dotted lines of FIG. 1), is greater than 10° and, hence, greater than the rate of divergence at which water flowing through region 20 would normally experience boundary layer separation along wall 15 within second region 20.

The draft tube wall 15 surrounding the discharge passage 17 within the second region 20 is provided with a plurality of orifices 21 through wall 15. Orifices 21 are circumferentially spaced about wall 15 in communication with discharge passage 17 in second region 20 where water flow would normally separate along wall 15. A plurality of connecting conduits 22 are provided connecting each of orifices 21 in fluid flow communication with a plurality of transfer conduits 23. Each of transfer conduits 23 extends from connecting conduits 22 in a downstream direction to first region 19.

A plurality of radially extending circumferentially spaced fluid inlet ports 27 are provided extending through wall 15 in first region 19. Each of ports 27 has a water receiving end 28 in fluid flow communication with each of transfer conduits 23. As shown in FIG. 3, ports 27 terminate at an inner surface 29 of wall 15 and define a port discharge orifice 30 at inner surface 29.

A plurality of injector nozzles 31 are provided within discharge passage 17 covering each of port discharge orifices 30. Nozzles 31 cooperate with wall 15 to define a nozzle discharge passage 32 in fluid flow communication with ports 27 and having nozzle discharge orifices 33 opening toward the downstream end 25 of draft tube 10.

In the operation of the draft tube 10, water is provided to flow to runner 11 from an upstream reservoir (not shown). Discharge ring 14 guides the flow of water past blades 13 to rotate runner 11. The water flows from water passages 14a into the first region 19 of the discharge passage 17 of draft tube 10 with the water flowing at an initial velocity. The water flows through region 19 with an average velocity and pressure of $V_1$ and $P_1$, respectively. As the water flows through region 19, the flow diverges concurrently with the divergence of region 19. As a result of this divergent flow, the water loses a portion of its velocity and increases in pressure. The rate at which the flow of water through region 19 diverges is sufficiently low to prevent boundary layer separation of the flow along wall 15 of region 19.

The water leaving the first region 19 enters the second region 20 and flows toward the discharge opening 18. As the water flows through region 20, the flow diverges at a rate at which boundary layer separation between the flow and wall 15 would normally occur. As a result of the divergent flow, the velocity of the flow within region 20 is further reduced to a velocity, $V_2$, less than the velocity, $V_1$. The pressure of the flow within region 20, $P_2$, is greater than the pressure, $P_1$, of the flow within region 19. The relation between the velocities and pressures of the flows within the regions 19 and 20 may be expressed by the following equation:

$$P_1 + V_1^2/2g + K_1 = P_2 + V_2^2/2g + K_2$$

where $P_1$, $V_1$, $P_2$ and $V_2$ and the pressure and velocity of the flows in regions 19 and 20 respectively, as described above. $K_1$ and $K_2$ are constants and g is the acceleration of gravity.

As can be determined from the equation, as $V_2$ decreases due to the increased divergence of the flow in second region 20, $P_2$ correspondingly increases to maintain the equilibrium of the equation. As a result of the pressure, $P_2$, in region 20 being greater than the pressure, $P_2$, in region 19, water flow which would otherwise tend to separate from the wall 15 within region 20 is urged through orifices 21 into conduits 22 where the differential in pressure between the regions urges the water to flow through conduits 23 to ports 27. The water flows into the nozzle discharge passage 32 and into the low pressure region 19.

In the embodiment shown in FIG. 4, an axially aligned manifold 35 is provided and connected in fluid flow communication with port discharge orifices 30 by conduits 36. A plurality of nozzles 37 are provided on manifold 35 and opening toward the draft tube downstream end 25. In the operation of the embodiment of FIG. 4, water flows into manifold 35 through conduits 36 and is distributed among nozzles 37. The water is discharged from the nozzles 37 into the center of the flow in region 19 such that the low energy flow taken from region 20 is injected into region 19 as far as possible from the wall 15.

As it can be seen from the foregoing, flow that would otherwise separate along the wall 15 within second region 20 is drawn off the wall 15 into transfer conduit 23 and discharged into first region 19 through nozzles 31 where the velocity of the flow is regained for diffuser recovery in the draft tube 10.

From the foregoing detailed description of the present invention, it has been shown how the objects of the invention have been attained in a preferred manner. However, modification and equivalents of the disclosed concepts such as readily occur to those skilled in the art are intended to be included in the scope of this invention. Thus, the scope of the invention is intended to be limited only by the scope of the claims as are, or may hereafter be, appended hereto.

The embodiments of the invention in which an exclusive property or privilege is claimed are defined as follows:

1. A draft tube for discharging water from a hydraulic turbine having a turbine runner rotatable about an axis of rotation; said draft tube having a wall defining a discharge passage diverging from said runner to a discharge opening; said draft tube having a first region downstream of said runner with said first region having a rate of divergence less than that at which boundary layer separation occurs; said draft tube also having a second region downstream of said first region and continuously connected thereto with said second region having a rate of divergence greater than that at which boundary layer separation would normally occur; said draft tube wall surrounding said discharge passage in said second region being provided with a plurality of orifices therethrough;

a plurality of nozzles disposed within said first region; said nozzles having a fluid inlet in water flow communication with said orifices; said nozzles having fluid outlets in communication with said discharge passage in said first region with said fluid outlets opening away from said runner;

said nozzles are disposed on said wall surrounding said discharge passage in said first region and closely adjacent said runner whereby fluid along said wall within said second region is conducted to said first region and readmitted to said discharge passage thereby reducing boundary layer separation in said second region.

2. A draft tube for discharging water from a hydraulic turbine according to claim 1 having means for providing said water flow communication between said orifices and said nozzle fluid inlets; said means comprising a plurality of pipes operably connected to establish water flow from said orifices to said fluid inlets of said nozzles.

3. A draft tube for discharging water from a hydraulic turbine according to claim 2 wherein said wall surrounding said discharge passage in said first region is of a circular cross section; said nozzles being circumferentially disposed on said wall.

4. A draft tube for discharging water from a hydraulic turbine having a turbine runner rotatable about an axis of rotation; said draft tube having a wall defining a discharge passage diverging from said runner to a discharge opening; said draft tube having a first region downstream of said runner with said first region having a rate of divergence less than that at which boundary layer separation occurs; said draft tube also having a second region downstream of said first region and continuously connected thereto with said second region having a rate of divergence greater than that at which boundary layer separation would normally occur; said draft tube wall surrounding said discharge passage in said second region being provided with a plurality of orifices therethrough;

a plurality of nozzles disposed within said first region; said nozzles having a fluid inlet in water flow communication with said orifices; said nozzles having fluid outlets in communication with said discharge passage in said first region with said fluid outlets opening away from said runner;

said nozzles are disposed on said first region and centrally located within said region whereby fluid along said wall within said second region is conducted to said first region and readmitted to said discharge passage thereby reducing boundary layer separation in said second region.

5. A draft tube for discharging water from a hydraulic turbine according to claim 4 wherein said nozzles are centrally disposed within said first region adjacent said runner.

* * * * *